(12) United States Patent
Woodruff et al.

(10) Patent No.: US 6,469,685 B1
(45) Date of Patent: Oct. 22, 2002

(54) DISPLAY PANEL FILTER AND METHOD OF MAKING THE SAME

(75) Inventors: Daniel P. Woodruff, Lakeville, MN (US); Bruce E. Kuhlmann, Santa Rosa; Jesse D. Wolfe, Discovery Bay, both of CA (US)

(73) Assignee: Viratec Thin Films, Inc., Faribault, MN (US)

( * ) Notice: Subject to any disclaimer, the term of this patent is extended or adjusted under 35 U.S.C. 154(b) by 0 days.

(21) Appl. No.: 09/103,039

(22) Filed: Jun. 23, 1998

Related U.S. Application Data

(63) Continuation-in-part of application No. 08/970,771, filed on Nov. 14, 1997.
(60) Provisional application No. 60/050,756, filed on Jun. 25, 1997, and provisional application No. 60/077,702, filed on Mar. 12, 1998.

(51) Int. Cl.$^7$ .................................................. G09G 3/28
(52) U.S. Cl. ........................ 345/60; 313/489; 348/818
(58) Field of Search ................................ 313/479, 484, 313/489, 472 R, 478–480; 428/216, 192, 428; 359/359, 360; 361/816–818; 348/818–820, 797; 345/60

(56) References Cited

U.S. PATENT DOCUMENTS

| | | | |
|---|---|---|---|
| 4,412,255 A | 10/1983 | Kuhlman et al. | |
| 4,462,883 A | 7/1984 | Hart | |
| 4,710,669 A | 12/1987 | Adamski | |
| 4,799,745 A | 1/1989 | Meyer et al. | |
| 4,910,090 A | 3/1990 | Kuhlman et al. | |
| 5,106,671 A | 4/1992 | Amberger et al. | |
| 5,110,662 A * | 5/1992 | Depauw et al. | 428/192 |
| 5,147,694 A | 9/1992 | Clarke | |
| 5,183,700 A | 2/1993 | Austin | |
| 5,372,874 A * | 12/1994 | Dickey et al. | 428/216 |
| 5,377,045 A | 12/1994 | Wolfe et al. | |
| 5,398,046 A | 3/1995 | Szegedi et al. | |
| 5,486,847 A | 1/1996 | Ranf et al. | |
| 5,539,275 A | 7/1996 | Arimoto et al. | |
| 5,595,825 A | 1/1997 | Guiselin | |
| 5,804,102 A | 9/1998 | Oi et al. | |
| 5,811,923 A * | 9/1998 | Zieba et al. | 313/479 |
| 5,874,801 A * | 2/1999 | Kobayashi et al. | 313/478 |
| 6,104,530 A | 8/2000 | Okamura et al. | |

FOREIGN PATENT DOCUMENTS

| | | |
|---|---|---|
| EP | 0299607 | 5/1988 |
| WO | 9828678 | 9/1997 |

* cited by examiner

*Primary Examiner*—Richard Hjerpe
*Assistant Examiner*—Alexander Eisen
(74) *Attorney, Agent, or Firm*—Dorsey & Whitney LLP

(57) ABSTRACT

The present invention provides a device in the form of a single filter which is useable in conjunction with a plasma display panel and which functions to reduce reflection after assembly to acceptable levels, to increase contrast enhancement ratios, to reduce EMI emissions to levels which comply with consumer safety regulations and with military and aircraft standards and to reduce infrared transmission in the 800 nm–1000 nm range to a level which does not interfere with IR remote control operation. The present invention also relates to a method of making such a plasma display panel filter.

23 Claims, 5 Drawing Sheets

DISPLAY PANEL FILTER AND METHOD OF MAKING THE SAME

This application claims the benefit of provisional application Serial No. 60/050,756 filed Jun. 25, 1997 and provisional application Serial No. 60/077,702 filed Mar. 12, 1998 and is a continuation-in-part of U.S. non-provisional application Ser. No. 08/970,771 filed Nov. 14, 1997, all of which are incorporated herein by reference.

BACKGROUND OF THE INVENTION

1. Field of the Invention

The present invention relates generally to a display panel filter, and more particularly to a filter having particular application for use with a plasma display panel. The present invention also relates to a method of making such a filter.

2. Description of the Prior Art

Visual display panels commonly known as plasma display panels or flat panel displays have been recently introduced for the purpose of displaying visual images or information on relatively large, flat screens. Plasma display panel technology utilizes selectively energized inert gas ions to bombard phosphors on a display screen, similar to an electron beam bombarding phosphors on a cathode ray tube (CRT) screen. Plasma display panels are similar to CRT displays in that both provide a means for visually displaying information or images from an input signal; however, important differences exist. First, a CRT display requires a significant depth dimension relative to the size of its display screen to accommodate a generally funnel shaped rearward portion for generation and deflection of the electron beam. Second, most CRT screens are curved. In contrast, the energization of the ions in a display panel using plasma display technology occurs in a relatively thin vacuum chamber adjacent to the display screen, resulting in a relatively thin display panel with a flat view face. Thus, plasma display panels are currently used primarily for relatively large display panels where CRTs are impractical or where a display panel with a significantly reduced depth dimension is necessary or desirable.

Although plasma display panels provide significant advantages and improvements by facilitating relatively large visual displays with a reduced panel depth and by otherwise facilitating the use of displays in environments with space restrictions which preclude the use of conventional CRT displays, new problems have arisen. These problems relate to the quality of the visual display, increased infrared (IR) and electromagnetic interference (EMI) emissions, low contrast ratio and consumer safety issues. For example, photopic reflection from current plasma display panels is in excess of 15%. This adversely affects the quality of the display. Further, operation of the plasma display panel produces or has the potential of producing infrared (IR) emissions which are capable in some cases of interfering with a remote control of the panel or other devices utilizing infrared signaling. Still further, operation of the plasma display panel results in the generation and emission of electromagnetic interference (EMI). Accordingly, many plasma panel displays fail to meet governmental TCO and FCC requirements for EMI emissions and the stricter standards for various military, aircraft and other uses. The above problems necessary limit the applicability and desirability of using plasma display panels.

Accordingly, there is a critical need in the art for a device or a filter useable in conjunction with plasma display panels for addressing and solving the above problems and limitations. A need also exists for a method of making such a device or filter.

SUMMARY OF THE INVENTION

To satisfy the need in the art, the present invention provides a device in the form of a single filter which is useable in conjunction with plasma display panels and which functions to reduce reflection after assembly to acceptable levels, to increase contrast enhancement, to assist in reducing EMI emissions to levels which comply not only with consumer safety regulations, but with the stricter military and aircraft standards, and to reduce infrared emissions in the 800 nm–1000 nm range to a level which does not interfere with remote control operation.

Generally, the present invention comprises a transparent filter lamination including a pair of outer substrates and one or more conductive layers and one or more dielectric layers laminated between the substrates. The combination of the conductive and dielectric layers function to provide the desired EMI and IR shielding and assists in reducing reflection and increasing contrast enhancement. The present invention contemplates that this combination of layers may be provided as a single film containing both conductive and dielectric layers or a structure in which the conductive and dielectric layers are applied and laminated separately.

More specifically, the preferred embodiment of the present invention comprises a transparent filter lamination including a pair of transparent substrates, an anti-reflective coating applied to the outer surfaces of each of the transparent substrates and an EMI/IR shielding film or filter laminated between the substrates. This shielding film or filter may be a single film comprised of a plurality of conductive and dielectric layers or it can be a conductive layer and a separate IR shielding layer or dielectric. The filter further includes an electrical connection member electrically connected to conductive layers within the EMI/IR shielding film. A means is also provided in the form of an electrical wire or the like for electrically connecting the electrical connection member to a grounded terminal.

In the preferred embodiment, the transparent substrates comprise view side and panel side substrates with the view side substrate being the substrate further from the display screen and the panel side substrate being the substrate closest to, or adjacent to, the display screen. Similarly, each of the substrates includes a view side facing away from the display screen and a panel side facing the display screen. In the preferred embodiment, the EMI/IR shielding film or filter is applied directly to the view side of the panel side substrate and the two substrates are laminated together by a urethane or other adhesive. The preferred embodiment further includes an environmental degradation barrier for the conductive layers within the EMI/IR shielding layer. This barrier extends around the edge of the laminated filter and is constructed of a conductive material. This barrier is electrically connected both with the electrical connection member or busbar and with a grounding terminal.

The method aspect of the present invention relates to a method of making a filter of the type described above for use in conjunction with a plasma display panel. Such method generally includes providing first and second transparent substrates, applying an anti-reflective coating to each of these substrates by sputtering, applying the EMI/IR shielding film or filter to one of the substrates and then laminating the substrates to one another.

Accordingly, an object of present invention is to provide a filter for use in conjunction with a plasma display panel.

Another object of the present invention is to provide a plasma display panel filter which provides anti-reflective, EMI shielding, contrast enhancement and infrared shielding capabilities and which also complies with consumer safety requirements.

A further object of the present invention is to provide a plasma display panel filter having one or more conductive layers and one or more dielectric layers formed or laminated between a pair of outer transparent.

A still further object of the present invention is to provide a plasma display panel filter with an improved film providing both EMI and IR shielding capabilities.

A further object of the present invention is to provide a plasma display panel filter with an improved means for electrically connecting the EMI shielding layer to a grounding terminal.

A still further object of the present invention is to provide a plasma display panel flter with an electrically conductive material around the edge of the filter to prevent environmental degradation of the EMI shielding layer and to maximize the EMI shielding efficiency of such layer.

Another object of the present invention is to provide a method of making a plasma display panel filter of the type described above.

These and other objects of the present invention will become apparent with reference to the drawings, the description of the preferred embodiment and method and the appended claims.

DESCRIPTION OF THE PREFERRED EMBODIMENT AND METHOD

In its broadest aspect, the present invention relates to a plasma display panel filter comprised of first and second outer substrates and a filter portion positioned between the substrates and functioning to provide EMI and IR shielding capabilities and antireflective (AR) capability. This filter portion includes one or more dielectric layers sandwiched between the outer substrate. In one embodiment, the conductive layers and the non-conductive or dielectric layers are applied separately as disclosed in FIG. 5 of the present application and in pending U.S. application Ser. No. 08/970,771 filed Nov. 14, 1997, the entirety of which is incorporated herein by reference. In another embodiment, the conductive and dielectric layers are applied in a single film on one of the substrates prior to laminating the substrates together. This embodiment is disclosed in FIGS. 2, 3 and 4 of the present application.

Figure 1:
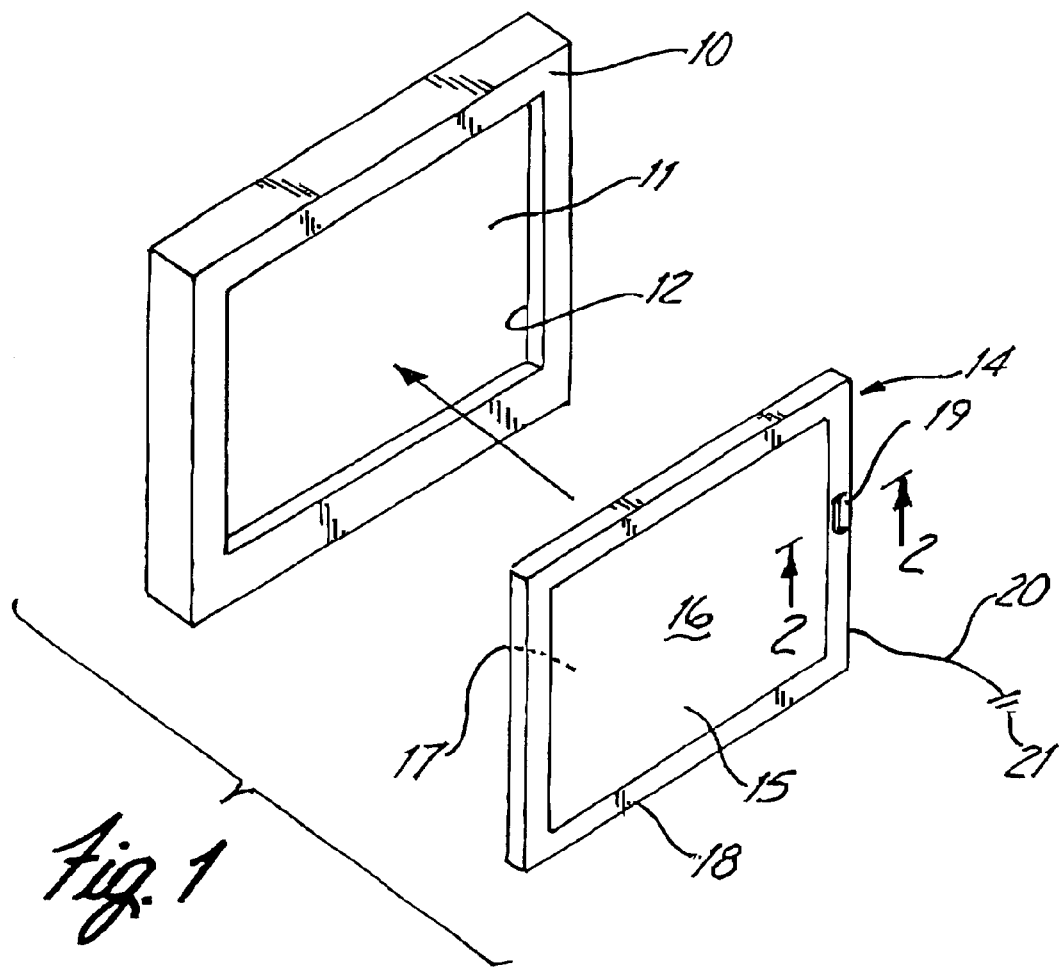
FIG. 1 is an isometric, exploded view of a plasma display panel and associated filter in accordance with the present invention.

Reference is first made to FIG. 1 illustrating an exploded, isometric view of a plasma display panel 10 and associated filter 14 in accordance with the present invention. The display panel 10 as illustrated in FIG. 1 in accordance with the preferred embodiment is a generally rectangular configured device having a front viewing or display screen 11 and a recessed area 12 for receiving a display panel filter 14. It should be understood, however, that the possible relationships between a plasma display panel and a filter in accordance with the present invention is not limited to the embodiment disclosed in FIG. 1. If desired, the display panel 10 can be assembled with the filter 14 being an integral part of the panel 10. Alternatively, the panel 10 and filter 14 can be separate, stand alone items which are purchased separately. In such case, means may be provided for suspending the filter 14 from a portion of the panel 10 or connecting the filter 14 to the panel 10 so that the filter 14 is directly in front of and substantially adjacent to the display screen 11.

With continuing reference to FIG. 1, the filter 14 of the preferred embodiment includes a generally flat, planer filter lamination 15 having a view side 16 facing away from the display screen 11 and an opposite panel side 17 facing the display screen 11. The filter 14 further includes an electrically conductive element 18 in the form of a strip of conductive material applied to the peripheral edge of the filter lamination 15. As illustrated in FIG. 1, the electrically conductive material 18 of the preferred embodiment extends around the periphery of the lamination 15 and for a limited distance inwardly on both the view side 16 and the panel side 17. As will be described in greater detail below, the conductive element 18 functions in conjunction with electrically conductive layers within the lamination 15 to provide EMI and some IR shielding capability to the filter. A grounding clip 19 is electrically connected with the conductor 18 for electrically connecting the conductor 18 to a ground terminal 21 via the electrical lead 20.

Figure 2:
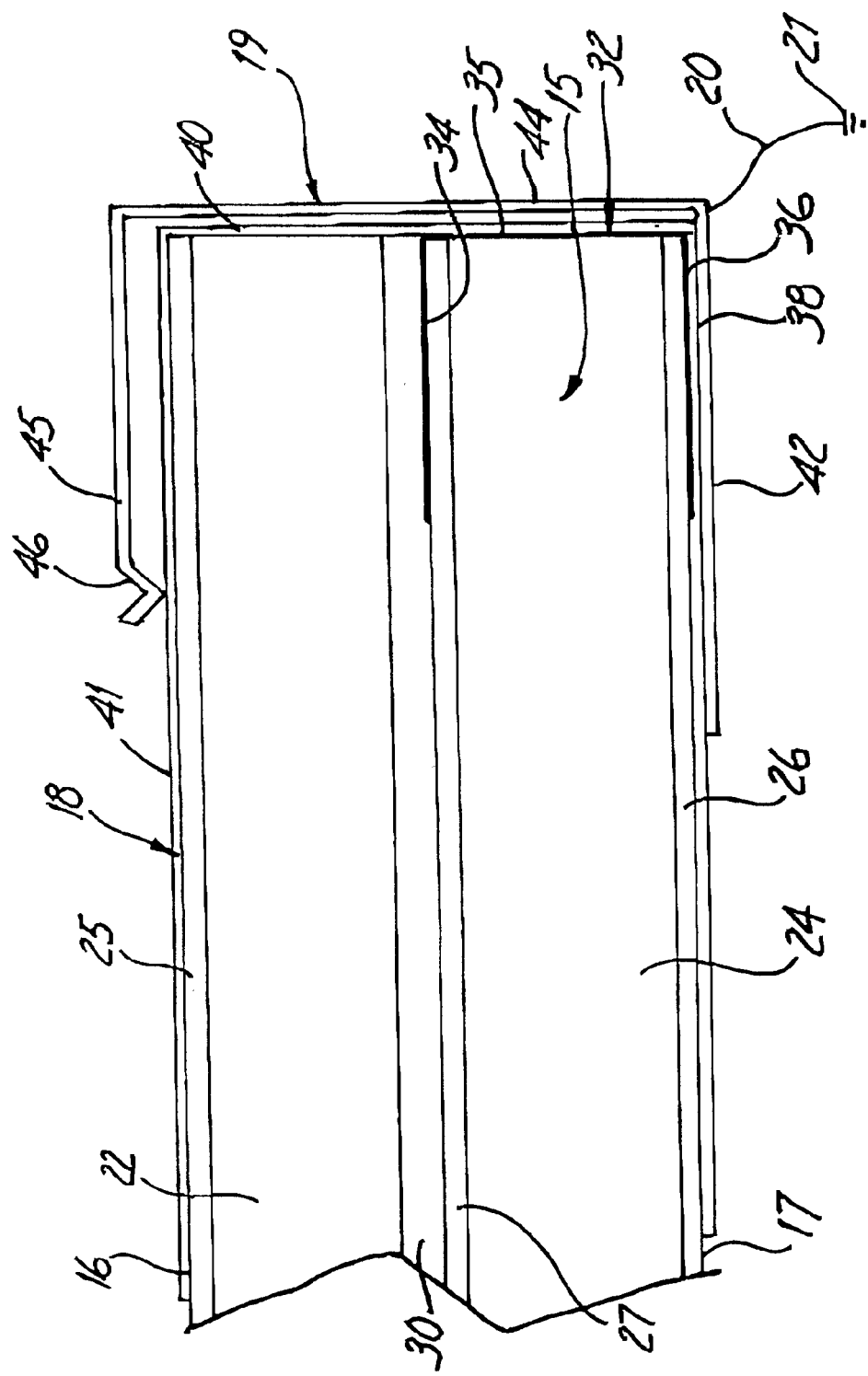
FIG. 2 is an enlarged view, partially in section, of one embodiment of a plasma display panel filter of the present invention as viewed along the section line 2—2 of FIG. 1.

Reference is next made to FIG. 2 which is a partial sectional view of the filter lamination 15 as viewed along the section line 2—2 of FIG. 1. In general, the filter lamination 15 includes a pair of transparent substrates 22 and 24. In the preferred embodiment, the substrate 22 is the view side substrate and the substrate 24 is the panel side substrate. Each of the substrates 22 and 24 is provided with an anti-reflective coating 25 and 26, respectfully, which is applied to the outer surfaces of the substrates, namely, to the view side of the view side panel and the panel side of the panel side panel. An EMI/IR shielding film 27 comprised of a combination of dielectric and conductive layers is applied to the view side of the panel side substrate 24 and between the substrate 22 and 24 to reduce and limit EMI emissions and to provide infrared shielding and contrast enhancement. The film 27 is thus laminated between the substrates 22 and 24 via the adhesive or lamination layer 30 after being applied to the substrate 24 by sputtering.

In the preferred embodiment, the transparent substrates 22 and 24 are comprised of generally flat, planer sheets of glass. It is contemplated, however, that the transparent substrates 22 and 24 could, if desired, be constructed of a transparent plastic or other synthetic material or a composite glass/synthetic material. The thicknesses of the substrates 22 and 24 should be selected to be as thin as possible while still being thick enough to provide the necessary and desirable safety and strength characteristics. In the preferred embodiment, the thickness of the substrates is preferably in the range of about 1.0 mm to about 2.0 mm or less for a filter having a viewing surface of about 2–10 square feet. However, it is contemplated that at least one of the substrates 22,24 could also be a thin film synthetic material such as polyethylene terapthalate (PET) on the order of 0.010 inches thick.

The anti-reflective coating 25 applied to the view side of the substrate 22, is similar to the anti-reflective coating 26 applied to the panel side of the substrate 24, and can be any antireflective coating known in the art. Preferably, the anti-reflective coatings 25 and 26 in accordance with the present invention are comprised of a plurality of individual layers which are applied to the respective surfaces of the substrates 22 and 24 via sputtering or reactive sputtering in accordance with processes known in the art. The particular makeup of these anti-reflective coatings should be effective to reduce the photopic reflection from the view side 16 and panel side 17 of the filter 15 to an acceptable level. In the structure of the preferred embodiment, the photopic reflection normally exhibited by the display screen 11 (FIG. 1) is preferably reduced by a factor of 10 or more by the filter of the present invention from a reflection of over 15% to a reflection of about 1.0% or less.

The specific structure of the anti-reflective coatings 25 and 26 is described in U.S. Pat. No. 5,372,874, the substance of which is incorporated herein by reference, and is currently sold by Viratec Thin Films, Inc. of Faribault, Minn. under the trademark CDAR. Other anti-reflective coatings, however, can also be used.

The film 27 is comprised of a combination of dielectric and conductive layers and is primarily designed to reduce the EMI and IR emissions to acceptable levels, while at the same time minimizing any adverse affect on the transmission of visible light through the filter. The film 27 is transparent and each of its dielectric and conductive layers is transparent. In the preferred embodiment, the film 27 is applied to the view side of the panel substrate 24 by sputtering or reactive sputtering and comprises a series of dielectric layers separated by layers of an electrically conductive material. Specifically, the film 27 includes four dielectric layers and three interleaved electrically conductive layers.

Figure 3:
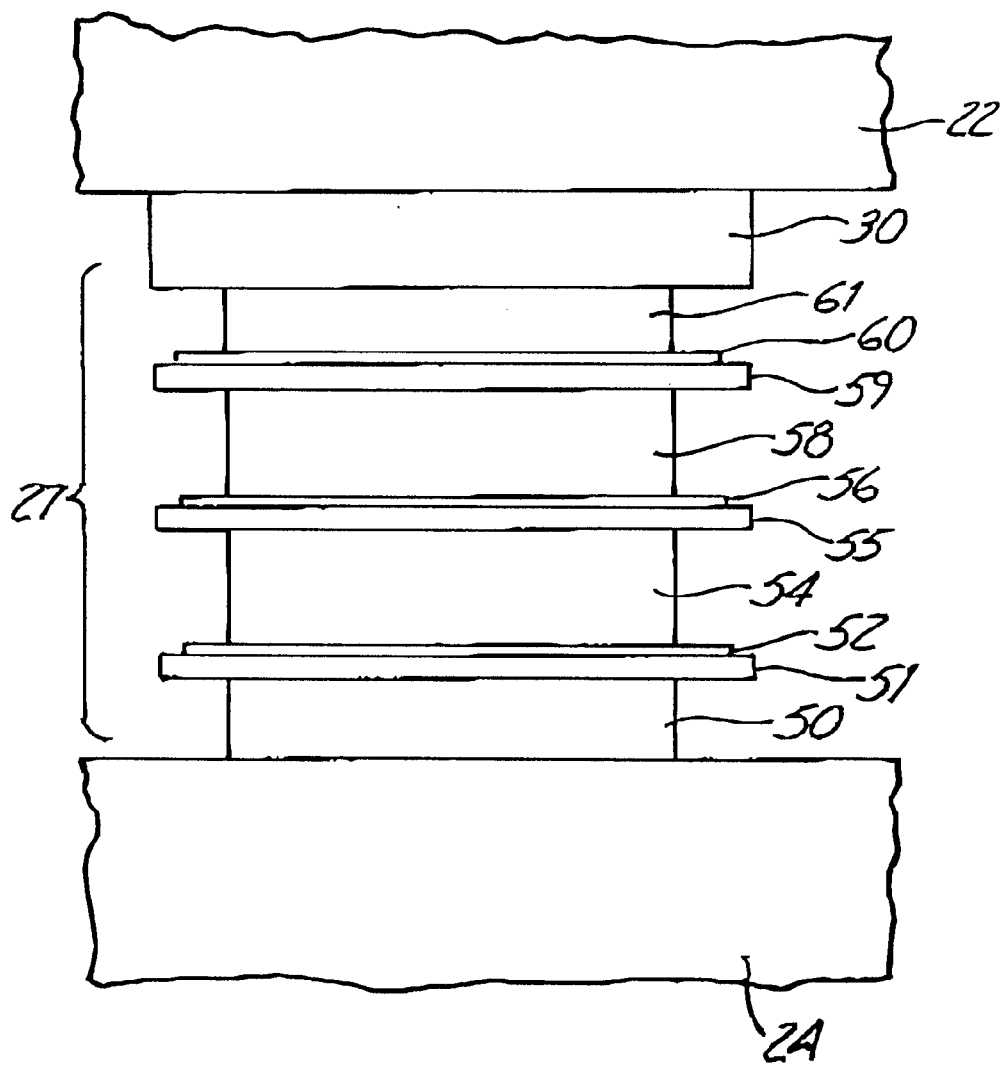
FIG. 3 is a schematic sectional view of the EMI/IR shielding film in accordance with the present invention.

With reference to FIG. 3, the layers 50, 54, 58 and 61 are layers of relatively high refractive index dielectrics having a refractive index of at least 1.7 and preferably about 2.2 to 2.8. The layers 51, 55 and 59 are layers of electrically conductive materials such as conductive metals. In some film 27 structures, layers 52, 56 and 60 of a further metal or other material are added adjacent to the conductive layers 51, 55 and 59 to prevent oxidation of the conductive layers during deposition of the dielectric layers 54, 58 and 61.

The electrically conductive layers 51, 55 and 59 are highly reflective of and/or absorb infrared and electromagnetic radiation. Thus they function primarily to reduce IR and EMI emissions generated in the plasma display panel. Preferably, EMI emissions are reduced to levels which comply with TCO and FCC regulations as well as the stricter military and aircraft standards. In general, the thicker the conductive layers 51, 55 and 59, the more effective they are in reducing IR and EMI emissions. However, increasing the thickness of the conductive layers 51, 55 and 59 also lowers the transmission of visible light. In the preferred embodiment, the conductive material layers 51, 55 and 59 are silver; however, various other conductive materials can be used as well including materials such as zinc, tin, titanium and indium, among others. Preferably, each of the layers 51, 55 and 59 has a thickness of about 5 mn to 20 nm and more preferably a thickness of about 10 nm to 15 nm. Most preferably, the thicknesses of the layers 51, 55 and 59 are 12 nm, 13 nm and 12 nm, respectively. The conductive layers are preferably applied by sputtering or reactive sputtering.

The dielectric layers 50, 54, 58 and 61 are high refractive index materials and function primarily to reduce reflectivity, and thus improve transmission of visible light in the regions of about 380 nm to 800 nm. In the preferred embodiment, the dielectric material of the layers 50, 54, 58 and 61 may include materials such as niobium pentoxide ($Nb_2O_5$), titanium dioxide ($TiO_2$) and tin oxide, among others. Preferably, however, the dielectric material is niobium pentoxide ($Nb_2O_5$).

The outer dielectric layers 50 and 61 have a preferred optical thickness of between about 0.4 to 0.8 at a wavelength of about 450 nm to 650 nm, while the inner dielectric layers 54 and 58 have an optical thickness between about 0.7 to 1.5 at a wavelength of about 450nm to 650 nm. As used above and throughout this application, the term "optical thickness" shall mean the "quarter wave optical thickness" or QWOT as it is known in the art. Preferably, the physical thickness of the outer layers 50 and 61 is about 20 nm to 50 nm and most preferably is about 30 nm to 40 nm. The physical thickness of the inner dielectric layers 54 and 58 is preferably about 50 nm to 90 nm and is most preferably about 60 nm to 70 nm.

In some film 27 structures where the film is formed by reactive sputtering the various film layers and the conductive material is reactive to one or more of the reactive materials making up the adjacent dielectric layer, it is necessary to first provide a thin protective or sacrificial material layer next to the conductive material layer to prevent its oxidation or other reaction to the reactive materials of the dielectric layers. In the embodiment of FIG. 3, the layers 52, 56 and 60 perform such a function. In the preferred structure of FIG. 3, a thin layer of titanium or some other sacrificial material is applied adjacent to the conductive material layer so that when the $Nb_2O_5$ is applied by reactive sputtering, the oxygen oxidizes the titanium layer 52, 56 and 60 rather than the conductive layer 51, 55 and 59. The oxidized titanium then forms part of the adjacent dielectric layer. In the preferred embodiment, the thickness of the protective layers 52, 56 and 60 are about 0.5 nm to 5 nm and most preferably about 3 nm to 5 nm.

The preferred embodiment of the film 27 is a seven layer film comprising three conductive material layers and four dielectric material layers. It is contemplated, however, that films with different total layers can also be utilized provided the number of conductive layers exceeds the number of dielectric layers by one. Thus, where n equals the number of conductive layers, the number of dielectric layers is n+1.

Accordingly, the film 27 comprises a plurality of conductive and dielectric layers including a pair of end dielectric layers and alternating conductive and inner dielectric layers disposed therebetween. The end dielectric layers have an optical thickness of between about 0.4 to 0.8 and preferably 0.6 at a wavelength of about 450 nm to 650 nm, the inner dielectric layers have an optical thickness of about 0.7 to 1.5 at a wavelength of about 450 nm to 650 nm and the conductive layers have a physical thickness of about 5 nm to 15 nm.

In the preferred embodiment, the film 27 is applied by sputtering the various film layers to the view side of the panel side substrate 24, with the layer 50 sputtered first and then followed by the layer 51, the layer 52 and sequentially by the layers 54, 55, 56, 58, 59, 60 and 61. The film carrying substrate 24 is then laminated to the substrate 22 via the adhesive or lamination layer 30, with the film 27 facing the substrate 22. The lamination material 30 in the preferred embodiment comprises a sheet of urethane adhesive. As shown, the adhesive sheet 30 is positioned between the film 27 and the panel side of the substrate 22. Many adhesives or laminations such as PVB, acrylic and/or others can, of course, be used to laminate the substrates 22 and 24 together; however, the particular adhesive or lamination materials selected should be capable of exhibiting transparent properties upon completion of the lamination. The adhesives may also be tinted or otherwise be provided with IR shielding capabilities. In accordance with the present invention, the layer 30 is positioned between the substrates 22 and 24 as shown and then placed in an autoclave under appropriate heat and pressure conditions for approximately four hours to laminate the layers together.

Figure 4:
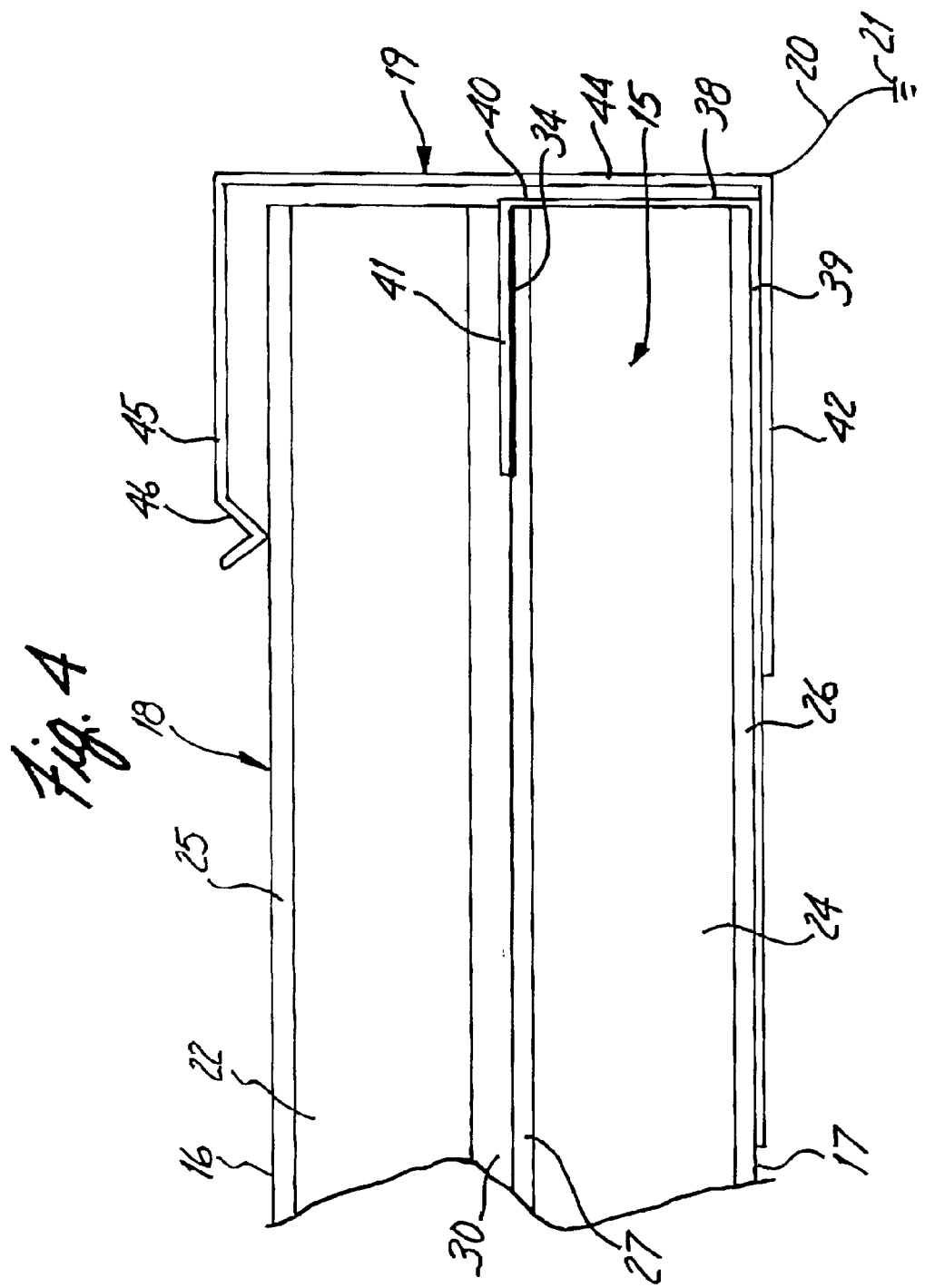
FIG. 4 is a view similar to that of FIG. 2 of a further plasma display panel filter in accordance with the present invention.

During assembly of the filter lamination 15, a busbar 32 is applied to the outer peripheral edge portion of the substrate 24. Preferably this busbar includes a first leg 34 electrically contacting the film 27 and extending inwardly from the outer peripheral edge of the substrate 24, a second leg 36 applied over the anti-reflective coating 26 and also extending inwardly from the outer peripheral edge of the substrate 24 and a third leg 35 electrically connected with the legs 34 and 36 and essentially extending over the entire peripheral edge of the substrate 24. If desired, the legs 35 and 36 can be eliminated as shown in FIG. 4.

In the preferred embodiment, the legs 34 and 36 extend inwardly from the peripheral edge of the substrate 24 for a distance of at least one mm and preferably a distance greater than or about two mm. Further, the busbar 32 in accordance with the present invention preferably extends around the entire periphery of the substrate 24 and thus the film 27. It is contemplated that the busbar 32 can be applied in a variety of ways. In the preferred embodiment, however, the busbar 32 is a solder based, electrically conductive material applied via ultrasonic welding.

Following application of the busbar 32 to the peripheral edge portion of the substrate 24, an environmental degradation barrier member 38 in the form of electromagnetic shielding tape is applied over the leg portion 35 of the busbar 32 and around the entire outer peripheral edge of the filter lamination 15. The member 38 includes a first leg 39 applied to the outer or panel side of the anti-reflective coating 26 along the outer peripheral edge of such coating 26 and a second leg 41 applied to the outer or view side of the anti-reflective coating 25 along the outer peripheral edge of the coating 25. Both of the legs 39 and 41 extend inwardly a limited distance from the outermost peripheral edges of the coatings 26 and 25, respectively. This limited distance is greater than 5 mm and preferably equal to or greater than about 9 mm. A third leg 40 is integrally formed with the legs 39 and 41 and extends completely around and covers the outermost peripheral edge of the lamination 15. The member 38 is applied to and connected with the busbar 32 and the outer peripheral portions of the lamination 15 and coatings 25 and 26 by an electrically conductive adhesive. Accordingly, the member 38 serves two primary functions: first, to prevent environmental degradation of the conductive layers 51, 55 and 59 of the film 27 by acting as a physical barrier to prevent exposure of such conductive layers to the environment and second, to make an electrical connection with the busbar 32 via the electrically conductive adhesive.

A means is also provided for electrically connecting the element 38, and thus the busbar 32 and the conductive layer 51, 55 and 59, to a grounding terminal 21. In the preferred embodiment, this means is in the form of a grounding clip 19 having a first leg 42 engaging the conductive leg 39 of the element 38, a second leg 45 with a spring contact member 46 for making electrical contact with the leg 41 of the member 38, and a third leg 44 joining the legs 42 and 45. An electrical lead 20 has one end connected to the connector clip 19 and a second end connected with the grounding terminal 21. Other means can of course be provided for making this electrical connection.

FIG. 4 shows an alternate embodiment for connecting the busbar 32 to the film 27 and connecting the tape 38 to the busbar 32. As shown in FIG. 4, the busbar is comprised only of the leg 34, with the legs 35 and 36 having been eliminated. In this embodiment the leg 41 of the tape 38 is provided directly over the busbar leg 34, with the legs 40 and 39 covering the end and a portion of the face, respectively, of the substrate 24. In this embodiment, both the busbar and the tape would be applied to the substrate 24 before lamination to the substrate 22.

The method aspect of the present invention, including the method of making the plasma display panel filter, can be understood as follows. First, a pair of transparent substrates such as glass or plastic or film, or a combination thereof, is provided. One of these substrates will ultimately form the view side substrate 22 positioned on the view side of the filter, while the other substrate will ultimately form the panel side substrate 24. Both of these substrates 22 and 24 are provided with anti-reflective coatings 25 and 26, respectively by sputtering.

Following this, the film 27 comprised of the plurality of dielectric and conductive layers are applied to the side of the substrate 24 opposite to the anti-reflective coating 26. Preferably, the film 27 and its individual layers are also applied by sputtering as previously described. Next, the busbar 32 is applied to the entire peripheral edge portion of the substrate 24. Preferably the legs of the busbar are applied in stages with the leg 34 first applied to the outer edges of the film 27 and the leg 35 applied to the outer peripheral edge of the substrate 24. In the embodiment of FIG. 4, the busbar is applied only in the form of the leg 34 and the tape is then applied to the substrate.

The substrates 22 and 24 are then laminated together by positioning the adhesive sheet 30 between the side of the substrate 22 opposite the coating 25 and the side of the substrate 24 carrying the film 27. The entire lamination lay-up is then placed in an autoclave under appropriately elevated heat and pressure conditions to laminate the lay-up together. In the preferred procedure, the lamination lay-up is exposed to a temperature of approximately 220° F. and a pressure of approximately 150 p.s.i. for about four hours.

When the lamination is complete, the outer leg 36 of the busbar of FIG. 2 is applied to the outer edges of the anti-reflective coating 25 and the conductive member or tape 38 is applied to the outer peripheral edge portions of the filter 15 as illustrated in FIG. 2. The grounding clip 19 is then applied to the member 38 as shown.

Figure 5:
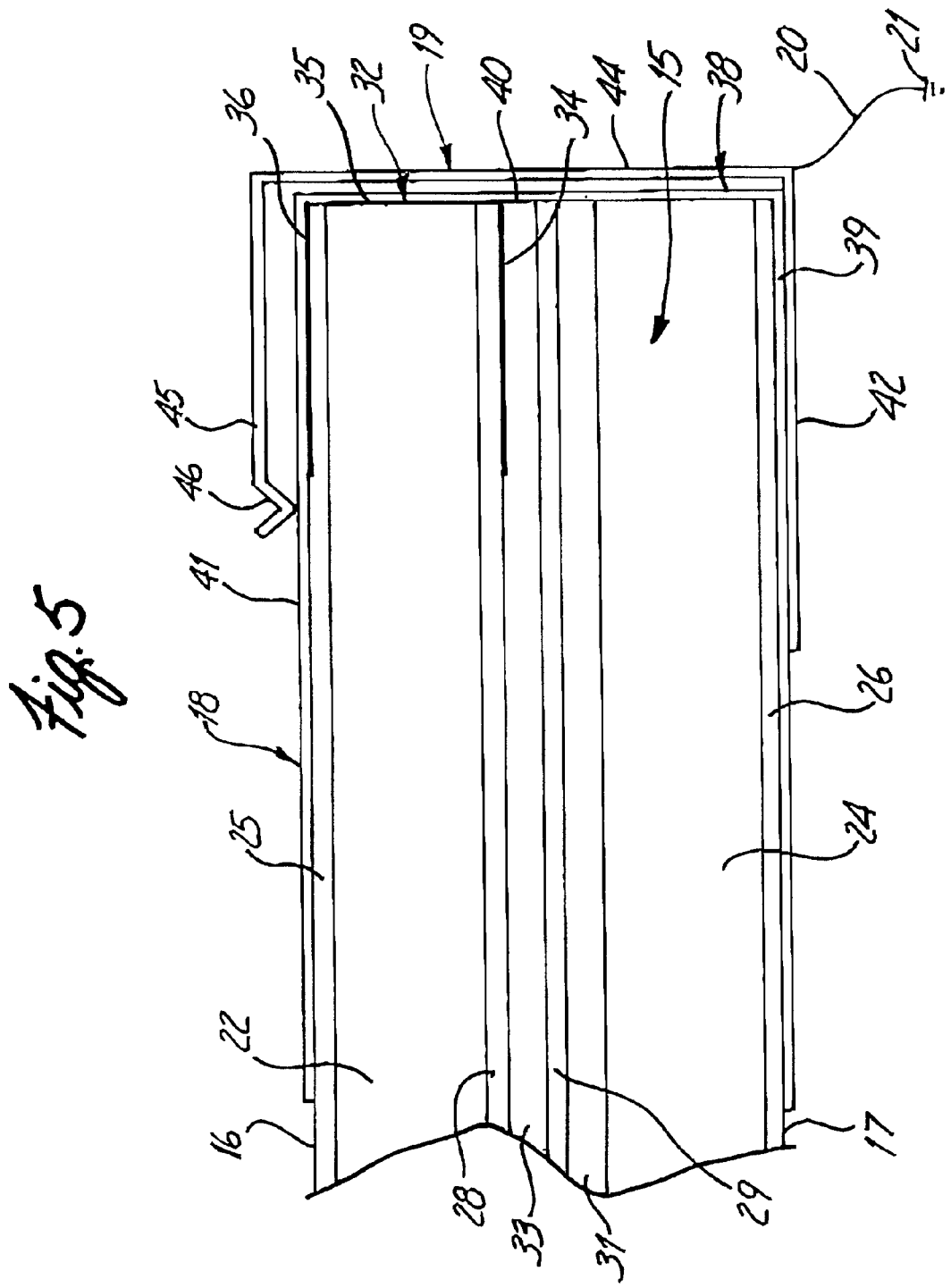
FIG. 5 is an enlarged view, partially in section, and similar to that of FIG. 2, of a further embodiment of a plasma display panel filter of the present invention.

In the embodiment of FIG. 5, the EMI/IR shielding filter is provided by the layers 28 and 29. Specifically, a conductive EMI shielding material layer 28 is applied to the panel or inner side of the substrate 22 to reduce and limit EMI emissions and an infrared shielding layer or dielectric 29 is laminated between the substrates 22 and 24 via the adhesive or lamination layers 33 and 31.

In the embodiment of FIG. 5, the electrically conductive material layer 28 is applied to the panel side of the substrate 22 as shown. Although this layer 28 can be constructed of a variety of materials, it must preferably include an electrically conductive component or layer which provides sufficient electrical conductivity, and thus sufficiently low electrical resistance, while still maintaining acceptable visible light transmission. Preferably, the conductive layer 28 exhibits sheet resistance of less than 5 ohms per square and more preferably less than 1.5 ohms per square. The layer 28 provides electromagnetic interference (EMI) shielding and assists in reducing EMI emissions to levels which comply with consumer safety regulations as well as the stricter military and aircraft standards. The layer 28 also provides an IR shielding function as well to assist in reducing infrared emissions to acceptable levels. Preferably the conductive layer 28 extends over the entire panel side of the substrate 22. This layer 28 can, if desired, comprise a single layer of an electrically conductive material such as silver or indium tin oxide (ITO) and can also comprise additional layers and materials such as other metals and materials which may be conductive as well as dielectrics and materials which may not be conductive. Such additional layers and materials can be provided to assist in infrared shielding and reduction of reflection as well as to provide contrast enhancement to the filter. This may be accomplished by introducing color or tint into the coating.

The layer 28 in the present invention can be applied to the substrate 22 by any known means. Preferably, however, the layer or layers which form the electrically conductive material layer 28 is applied by sputtering or reactive sputtering one or more metals such as zinc, tin, silver, titanium or indium or their metal oxides. The thickness of the layer 28 should preferably be in the range of less than 2500 Å and most preferably in the range of 2000–2500 Å.

The infrared shielding layer 29 comprises an infrared shielding film which is a separate, free-standing film and is sandwiched between, and laminated to, the substrates 22 an 24 by the lamination material 33 and 31. The infrared shielding film 29 can comprise any film which functions to provide near infrared shielding capability such as dyed polyethylene terapthalate (PET) or dyed polyurethane. In the preferred embodiment, the film thickness ranges from 5–10 mils and further includes contrast enhancement capability. The film 29 is effective to reduce the infrared transmission in the 800 nm–1000 nm range to a level preferably less than 20%. At these reduced levels, interference with infrared remote control transmitters either for the panel display in question or other remote control devices is eliminated.

The lamination materials 33 and 31 in the preferred embodiment comprise sheets of urethane adhesive. As shown, one adhesive sheet 33 is positioned between the shielding film 29 and the coating 28, while the other urethane adhesive sheet 31 is positioned between the shielding film 29 and the view side of the substrate 24. Many adhesives or laminations such as PVB, acrylic and/or others can, of course, be used to laminate the infrared shielding film 29 between the coated substrates 22 and 24; however, the particular adhesive or lamination materials selected should be capable of exhibiting transparent properties upon completion of the lamination. The adhesives may also be tinted or otherwise be provided with IR shielding capabilities. In accordance with the present invention, the layers 29, 33 and 31 are positioned between the substrates 22 and 24 as shown and then are placed in an autoclave under appropriate heat and pressure conditions for approximately four hours to laminate the layers together.

Alternative methods of applying the infrared shielding layer 29 may also be utilized. For example, a recently introduced technique involves positioning the coated substrates 22 and 24 in spaced relationship and sealing the edges so as to form a cavity for accommodating an infrared shielding material between the spaced substrates. A liquid or flowable infrared material such as an acrylic into which infrared shielding material is incorporated is then introduced into the space between the substrates so that it flows over the entire substrate surfaces. This material is then allowed to cure via ultraviolet exposure or otherwise to produce the infrared shielding layer.

Near infrared shielding may also be provided by using thin film coatings which are applied by sputtering or other thin film application techniques.

The method aspect of the present invention relating to the embodiment of FIG. 5, including the method of making the plasma display panel filter, can be understood as follows. First, a pair of transparent substrates such as glass or plastic are provided. One of these substrates will ultimately form the view side substrate 22 positioned on the view side of the filter, while the other substrate will ultimately form the panel side substrate 24. Both of these substrates 22 and 24 are provided with anti-reflective coatings 25 and 26, respectively by sputtering.

Following this, the EMI shielding layer in the form of the electrically conductive coating 28 is also applied to the panel side of the substrate 22. Preferably, this coating is also applied by sputtering. Next, the busbar 32 is applied to the entire peripheral edge portion of the substrate 22. Preferably the legs of the busbar are applied in stages with the leg 34 first applied to the outer edges of the coating 28 and the leg 35 applied to the outer peripheral edge of the substrate 22.

The infrared shield film 29 is then laminated between the coated substrates 22 and 24 by positioning one adhesive sheet 33 between the infrared shielding film 29 and the conductive coating 28 of the substrate 22 and a second adhesive lamination sheet 31 between the other side of the infrared shielding film 29 and the view side of the substrate 24. The entire lamination lay-up is then placed in an autoclave under appropriately elevated heat and pressure conditions to laminate the lay-up together. In the preferred procedure, the lamination lay-up is exposed to a temperature of approximately 220° F. and a pressure of approximately 150 p.s.i. for about four hours.

When the lamination is complete, the outer leg 36 of the busbar is applied to the outer edges of the anti-reflective coating 25 and the conductive member 38 is applied to the outer peripheral edge portions of the filter 15 as illustrated in FIG. 2. The grounding clip 19 is then applied to the member 38 as shown.

Although the description of the preferred embodiment and method have been quite specific, it is contemplated that various modifications may be made without deviating from the spirit of the present invention. Accordingly, it is intended that the scope of the present invention be dictated by the appended claims rather than by the description of the preferred embodiment and method.

What is claimed is:

1. A transparent plasma display panel filter for use with and positioning in front of a plasma display panel, said filter comprising:

a first transparent substrate having a view side and a panel side;

a second transparent substrate having a view side and a panel side; and means between said first and second substrates to reduce transmission of EMI and IR emissions from the plasma display panel through the filter, said means consisting essentially of an EMI/IR shielding film positioned between the panel side of said first transparent substrate and the view side of said second transparent substrate, said shielding film having first, second and third conductive layers, at least one dielectric layer between said first conductive layer and one of the panel side of said first transparent substrate and the view side of second transparent substrate, at least one dielectric layer between said first and second conductive layers, at least one dielectric layer between said second and third conductive layers and at least one dielectric layer between said third conductive layer and the other of the panel side of said first transparent substrate and the view side of said second transparent substrate.

2. The plasma display panel filter of claim 1 wherein said conductive layers comprise layers of one or more conductive materials including zinc, tin, titanium and indium.

3. The plasma display panel filter of claim 1 wherein said dielectric layers comprise layers of one or more dielectric materials including niobium pentoxide, titanium dioxide and tin oxide.

4. The plasma display panel filter of claim 3 wherein said dielectric layers comprise layers of niobium pentoxide.

5. The plasma display panel filter of 1 wherein said dielectric layers have a refractive index greater than about 1.7.

6. The plasma display panel filter of 1 including a sacrificial material layer between each conductive material layer and at least one adjacent dielectric material layer.

7. The plasma display filter of claim 1 wherein said shielding film includes a pair of outer dielectric layers having an optical thickness of between about 0.4 and 0.8 at a wavelength of about 450 nm to 650 nm and a pair of inner dielectric layers having an optical thickness of about 0.7 to 1.5 at a wavelength of about 450 nm to 650 nm and said conductive layers are interleaved between each of said outer and inner dielectric layers.

8. The plasma display filter of claim 7 wherein each of said conductive layers has a thickness of about 5 nm to 20 nm.

9. The plasma display filter of claim 1 including an electrical connection member electrically connected with said conductive layers.

10. The plasma display panel filter of claim 9 wherein said filter lamination includes an outer peripheral edge and said electrical connection member extends from said conductive layers to said outer peripheral edge.

11. The plasma display panel filter of claim 10 wherein said electrical connection member extends around the entire peripheral edge of said filter lamination.

12. The display panel of claim 1 wherein said at least one dielectric layer between said first and second conductive layers, between said second and third conductive layers and between said third conductive layers and said other of the panel side of said first transparent substrate and the view side of said second transparent substrate include a sacrificial dielectric.

13. The display panel of claim 12 wherein said sacrificial dielectric is titanium dioxide.

14. A method of making a filter for use with and positioning in front of a plasma display panel comprising the steps of:
providing a first transparent substrate;
providing a second transparent substrate;
applying an EMI/IR shielding film to said first transparent substrate, said EMI/IR shielding film consisting essentially of first, second and third conductive layers and at least one dielectric layer between said first transparent substrate and said first conductive layer, at least one dielectric layer between said first and second conductive layers, at least one dielectric between said second conductive layer and a first side of said third conductive layer and at least one dielectric layer on a second side of said third conductive layer; and laminating said first and second transparent substrates together with said EMI/IR shielding film therebetween with said second transparent substrate adjacent to said third conductive layer.

15. The method of claim 14 wherein said laminating step results in the formation of a laminated structure having a peripheral edge and the method includes applying an electrically conductive barrier material to said peripheral edge.

16. The method of claim 14 including providing a plasma display panel having a display screen and connecting said filter to said plasma display panel in a position adjacent to said display screen.

17. The method of claim 14 wherein said at least one dielectric layer between said first and second conductive layers, between said second and third conductive layers and between said third conductive layers and said at least one dielectric layer on said second side of said third conductive layer include a sacrificial dielectric.

18. The method of claim 17 wherein said sacrificial dielectric is titanium dioxide.

19. A plasma display panel filter for a plasma display panel comprising:
a first transparent substrate;
means to reduce transmission of EMI and IR emissions from the plasma display panel through the filter, comprising an EMI/IR shielding film applied to said first transparent substrate, said shielding film comprising a first sputter coated dielectric material layer comprising at least one dielectric material applied to said first transparent substrate, a first sputter coated conductive material layer applied to said first dielectric material layer, a second sputter coated dielectric material layer comprising at least one dielectric material applied to said first conductive layer, a second sputter coated conductive material layer applied to said second dielectric material layer, a third sputter coated dielectric material layer comprising at least one dielectric material applied to said second conductive material layer, a third sputter coated conductive material layer applied to said third dielectric material layer and a fourth sputter coated dielectric material layer comprising at least one dielectric material applied to said third conductive material layer; and
a second transparent substrate laminated to said first transparent substrate with said shielding film positioned between said first and second transparent substrates and said second transparent substrate adjacent to said fourth sputter coated dielectric material layer.

20. The display panel filter of claim 19 wherein each of said sputter coated dielectric material layers is niobium oxide ($Nb_2O_5$) and each of said sputter coated conductive layers is silver.

21. The display panel filter of claim 20 including a sacrificial layer of a dielectric material applied between said first conductive material layer and said second dielectric material layer, between said second conductive layer and said third dielectric material layer and between said third conductive material layer and said fourth dielectric material layer.

22. The display panel of claim 19 wherein said second, third and fourth dielectric material layers include a sacrificial dielectric.

23. The display of claim 22 wherein said sacrificial dielectric is titanium dioxide.

* * * * *